US009849551B2

(12) United States Patent
Ebihara et al.

(10) Patent No.: US 9,849,551 B2
(45) Date of Patent: Dec. 26, 2017

(54) TOOL GRIPPING MECHANISM

(71) Applicant: FANUC CORPORATION, Yamanashi (JP)

(72) Inventors: Kenzo Ebihara, Yamanashi (JP); Takeshi Ooki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 67 days.

(21) Appl. No.: 14/718,396

(22) Filed: May 21, 2015

(65) Prior Publication Data
US 2015/0343582 A1 Dec. 3, 2015

(30) Foreign Application Priority Data

May 27, 2014 (JP) ................. 2014-109272

(51) Int. Cl.
*B23Q 3/18* (2006.01)
*B23B 31/28* (2006.01)
*B23Q 3/12* (2006.01)
*B23B 31/02* (2006.01)
*B23B 51/12* (2006.01)

(52) U.S. Cl.
CPC .............. *B23Q 3/186* (2013.01); *B23B 31/02* (2013.01); *B23B 31/28* (2013.01); *B23Q 3/12* (2013.01); *B23B 51/12* (2013.01); *B23B 2260/10* (2013.01); *Y10T 279/23* (2015.01)

(58) Field of Classification Search
CPC .......... B23Q 3/12; B23Q 3/186; B23B 51/12; B23B 31/28; B23B 31/02; B23B 2260/008; B23B 2260/10; B23B 2233/12; Y10T 279/23
See application file for complete search history.

(56) References Cited

U.S. PATENT DOCUMENTS 2,883,197 A * 4/1959 Gotha ................. B23B 31/28
279/128
2,953,970 A * 9/1960 Maynard ................ G02B 7/00
248/206.5

(Continued)

FOREIGN PATENT DOCUMENTS

DE    EP 0775546 A1 *  5/1997  ............. B23B 31/28
GB    1111390 A    *  4/1968  ............. B23B 31/28

(Continued)

OTHER PUBLICATIONS

Office Action in JP Application No. 2014-109272, dated Apr. 4, 2017.

(Continued)

*Primary Examiner* — Eric A Gates
*Assistant Examiner* — Chwen-Wei Su
(74) *Attorney, Agent, or Firm* — Hauptman Ham, LLP

(57) ABSTRACT

A tool gripping mechanism includes a tool holder and a shaft to which the tool holder is attached. The shaft is fixed to a rotary shaft of a spindle device. A plurality of magnets are disposed in pairs on concentric circles on surfaces of the tool holder and the shaft which face each other. When the tool holder is in a specific phase with respect to the shaft, the magnets of the tool holder and the magnets of the shaft attract each other, and the tool holder is aligned with respect to the shaft in that phase.

12 Claims, 6 Drawing Sheets

(56) References Cited

U.S. PATENT DOCUMENTS

| | | | | |
|---|---|---|---|---|
| 2,972,485 A * | 2/1961 | Ferchland | ............... | B23B 31/28 |
| | | | | 335/288 |
| 4,766,788 A * | 8/1988 | Yashiki | ................ | B23B 31/307 |
| | | | | 279/3 |
| 5,002,442 A * | 3/1991 | Rutschle | ............. | B23Q 1/0027 |
| | | | | 408/238 |
| 2002/0098788 A1* | 7/2002 | Edinger | ................. | B24B 23/02 |
| | | | | 451/490 |
| 2006/0120819 A1* | 6/2006 | Honegger | ............... | B23B 41/14 |
| | | | | 409/235 |
| 2007/0057473 A1* | 3/2007 | Pavey | ................. | B23B 31/202 |
| | | | | 279/131 |
| 2012/0227355 A1* | 9/2012 | Schoenfelder | ........ | B67B 3/2066 |
| | | | | 53/287 |
| 2015/0052720 A1* | 2/2015 | Weyland | ................ | B23B 31/28 |
| | | | | 29/243.521 |

FOREIGN PATENT DOCUMENTS

| | | | |
|---|---|---|---|
| JP | 60-78237 U | 5/1985 | |
| JP | 5-69203 A | 3/1993 | |
| JP | 10-225845 A | 8/1998 | |
| JP | 2001-328014 A | 11/2001 | |
| JP | 2010-207972 A | 9/2010 | |
| SE | WO 2007106029 A1 * | 9/2007 | ........... B23B 31/005 |

OTHER PUBLICATIONS

Decision to Grant a Patent in JP Application No. 2014-109272, dated Jun. 20, 2017.

* cited by examiner

TOOL GRIPPING MECHANISM

RELATED APPLICATIONS

The present application claims priority to Japanese Application Number 2014-109272, filed May 27, 2014, the disclosure of which is hereby incorporated by reference herein in its entirety.

BACKGROUND OF THE INVENTION

1. Field of the Invention

The present invention relates to a tool gripping mechanism for gripping a tool of a machine tool.

2. Description of the Related Art

Generally, in an ultra-precision machine tool, an automatic tool exchange system is not employed for reasons such as accuracy at the time of tool attachment and detachment and the size of the machine system. In a machining machine which performs the mold machining of an optical component, machining is generally performed with a single tool, and the deflection adjustment and dynamic balance adjustment of a tool are performed every time a tool exchange is performed.

A rotating tool is attached to a fluid bearing spindle provided in an ultra-precision machine tool. Since the fluid bearing spindle is an air turbine spindle or the like and rotates at high speed, the body of the spindle is compact. Accordingly, it is difficult to provide a complicated structure for tool exchange in the shaft of the spindle. Some ultra-precision machine tools employ shrink-fitting for tool exchange. However, in terms of temperature stability, it is not desirable to provide a heat source which heats up to almost 500° C., in or around the machine for that purpose. In particular, in ultra-precision machine tools in which an accuracy on the order of several nanometers is required, it is difficult to employ shrink-fitting for tool exchange.

Moreover, in the field of ultra-precision machining, dynamic balance adjustment is important for machining. In the case where machining is performed by rotating a spindle at a rotational speed of several tens of thousands revolutions per minute, deflection and vibration affect machining, and therefore balance needs to be adjusted to around several milligrams. Accordingly, shaft misalignment and an imbalanced state of a tool cannot be ignored. In an air turbine spindle often used in ultra-precision machining, since the phases of the tool and the shaft cannot be automatically matched with each other at present, dynamic balance adjustment needs to be performed after a tool holder is attached to the shaft.

SUMMARY OF THE INVENTION

Accordingly, an object of the present invention is to provide a tool gripping mechanism in which the arrangement of magnets enables a tool holder to be attached to a shaft with the phases thereof matched with each other when the tool holder is attached to the shaft.

Paying attention to the fact that a cutting force is weak in machining by an ultra-precision machine tool, the present invention employs tool attachment and detachment using magnets. Magnets are provided in a surface of a tool holder for gripping a tool and a surface of a shaft which face each other, and the tool holder is gripped by attractive forces of the magnets. A plurality of magnets are disposed on a circumference on the surface of the tool holder, and a plurality of magnets are also disposed on a circumference on the surface of the shaft. Thus, an attractive force of the tool holder with respect to the shaft is ensured. Further, the polarities of only a pair of magnets among the magnets disposed in the surfaces of the tool holder and the shaft are set to be different from those of the other magnets. This fixes a phase in which the tool holder is attached. Meanwhile, when the tool holder is removed from the shaft, air or the like is passed through a hole provided in the shaft under pressure to weaken the magnetic forces.

Installing an automatic tool exchange system in an ultra-precision machine tool enables a plurality of tools to be automatically exchanged, and therefore can realize long-time machining. For example, integrated machining from rough machining to finish machining can be performed by automatically exchanging a tool for rough machining for a tool for finish machining. By setting the polarities of only a pair of magnets among the magnets to be opposite to those of the other magnets, an only phase for the shaft and the tool holder can be determined. Accordingly, by performing balance adjustment in advance for a phase-matched combination of a tool holder and a shaft, machining can be performed soon after the tool holder is attached to the shaft, because dynamic balance adjustment is not needed.

A tool gripping mechanism according to the present invention includes a tool holder to which a tool can be attached and a shaft to which the tool holder is attached. The shaft is fixed to a rotary shaft of a spindle device. The tool holder and the shaft have a first surface and a second surface, respectively, the first and second surfaces facing each other. Further, at least two magnets are disposed in the first surface of the tool holder, and at least one of the at least two magnets has pole directions different from those of the other of the at least two magnets. Moreover, magnets are disposed in the second surface of the shaft to be located at positions corresponding to the magnets disposed in the first surface and to generate magnetic forces in directions in which the magnets disposed in the first surface are attracted.

According to the present invention, the arrangement of the magnets enables the tool holder to be attached to the shaft with the phases of the shaft and the tool holder matched with each other. Moreover, as the sizes and number of the magnets increase, attractive forces increase, and therefore the tool can be gripped more strongly. Moreover, by preparing a combination in which only a pair of magnets among the plurality of magnets disposed in the surfaces of the tool holder and the shaft have polarities different from the other magnets (only one magnet of the plurality of magnets disposed in the surface of the shaft is oriented such that the N pole points upward, and the other magnets thereof are oriented such that the S pole points upward; and only one magnet of the plurality of magnets disposed in the surface of the tool holder is oriented such that the S pole points downward, and the other magnets thereof are oriented such that the N pole points downward), the tool holder can be connected to the shaft in a combination in which the only phase is achieved. Thus, with the tool gripping mechanism according to the present invention, the phases of the tool and the shaft can be matched with each other. Accordingly, by preparing a tool holder corresponding to an imbalance of the tool, dynamic balance adjustment after the attachment of the tool holder to the spindle becomes unnecessary.

The shaft may be supported by the rotary shaft of the spindle device with a fluid bearing interposed therebetween. In this aspect, since the shaft is supported by a bearing, such as a fluid bearing (e.g., air bearing), which has a low resistance to rotation, the effect that the shaft is rotated by the magnetic forces can be obtained. When the tool holder is automatically attached to the shaft, the approach of the shaft to the tool holder causes the shaft to be rotated by magnetic forces, and then the shaft stops in a phase in which the only combination is achieved. Thus, the tool holder can be attached to the shaft in a state in which the phases of the tool holder and the shaft are matched with each other. In an air turbine spindle, since a mechanical part includes no structure which generates a magnetic force, alignment cannot be fixed. Accordingly, alignment using magnets is effective.

The tool holder and the shaft may include paired tapered portions, respectively, such that the tool holder is coaxially attached to the shaft. In this aspect, since tapered portions are provided in both of the tool holder and the shaft, the tapered portions serve as guides. Accordingly, the tool holder can be coaxially attached to the shaft.

The shaft may have a through hole at an end face opposite to a surface to which the tool holder is attached, the through hole axially passing through the end face toward the tool holder. In this aspect, at the time of a tool exchange, by applying the pressure of air or the like from a back portion of the through hole in the shaft toward the tool holder, the magnetic forces between the tool holder and the shaft can be weakened to make it easy to separate off the tool holder from the shaft.

The magnets disposed in the second surface of the shaft may be axially symmetric with respect to the shaft. In this aspect, since the magnets are axially symmetric with respect to the shaft, the influence of an imbalance of the shaft is reduced, and balance adjustment after a tool holder change becomes unnecessary.

The present invention can provide a tool gripping mechanism in which the arrangement of magnets enables a tool holder to be attached to a shaft with the phases thereof matched with each other when the tool holder is attached to the shaft.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

Figure 1:
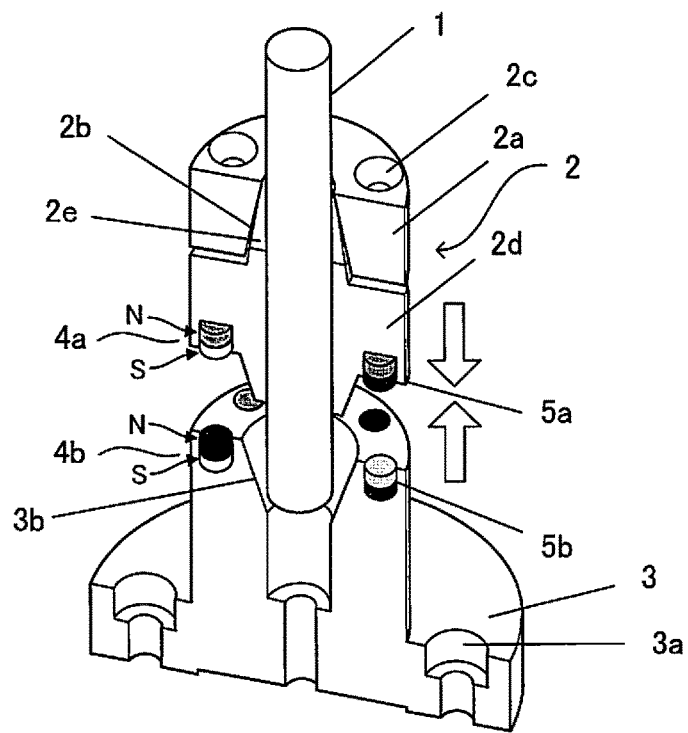
FIG. 1 is a cross-sectional view for explaining the structures of a tool holder and a shaft constituting one embodiment of a tool gripping mechanism according to the present invention.

The structures of a tool holder and a shaft constituting one embodiment of a tool gripping mechanism according to the present invention will be described with reference to FIG. 1.

A tool gripping mechanism for gripping a tool 1 includes a tool holder 2 and a shaft 3. The tool 1 is attached to the tool holder 2.

The tool holder 2 includes a tool holder body portion 2d and a fastening member 2a having at a center thereof a through hole 2b through which the tool 1 is inserted. The through hole 2b of the fastening member 2a has a shape in which an inner diameter thereof gradually increases toward the tool holder body portion 2d. The fastening member 2a has bolt holes 2c for bolt installation which are provided parallel to the through hole 2b. Moreover, the tool holder body portion 2d has nail portions 2e, a through hole 2f, and internal threaded portions (not shown) for fixing bolts installed in the bolt holes 2c. The through hole 2b of the fastening member 2a and the nail portions 2e of the tool holder body portion 2d constitute a wedge structure.

The gripping of the tool 1 by the tool holder 2 of FIG. 1 will be described.

First, the nail portions 2e of the tool holder body portion 2d are fitted into the through hole 2b of the fastening member 2a to temporarily connect the fastening member 2a and the tool holder body portion 2d together. Then, the tool 1 is inserted into the through hole 2b of the fastening member 2a and the through hole 2f of the tool holder body portion 2d. Bolts (not shown) are installed in the bolt holes 2c of the fastening member 2a, and the tool 1 is fixed to the tool holder 2 by a wedge structure formed by the through hole 2b of the fastening member 2a and the nail portions 2e of the tool holder body portion 2d.

The shaft 3 has bolt holes 3a to be fixed to a rotary shaft of rotationally driving means (not shown) by passing bolts (not shown) through the bolt holes 3a. It should be noted that the shaft 3 has a funnel-shaped portion 3b into which an end portion of the tool 1 is inserted.

Magnets 4a, 5a; 4b, 5b are respectively attached to a surface of the tool holder body portion 2d and a surface of the shaft 3 which face each other when the tool holder body portion 2d is fixed to the shaft 3. Specifically, one magnet 4a and a plurality of magnets 5a are disposed on a circumference on the surface of the tool holder body portion 2d, and one magnet 4b and a plurality of magnets 5b are disposed on a circumference on the surface of the shaft 3 to be located at positions corresponding to the magnets 4a and 5a, which are disposed on the surface of the tool holder body portion 2d, and to generate magnetic forces in directions in which the magnets 4a and 5a are attracted, respectively.

Accordingly, since attractive forces between the magnets 4a and 5a and the magnets 4b and 5b act between the tool holder 2 and the shaft 3, the tool holder 2 can be attached to the shaft 3. In an ultra-precision machine tool, since a cutting force thereof is weak, connection by the magnets 4a and 5a and the magnets 4b and 5b has a sufficient force. However, since the number of revolutions of the shaft 3 is several tens of thousands revolutions per minute, it is desirable that more than one of the magnets 4a, 5a, 4b, 5b are strong neodymium magnets.

Figure 2:
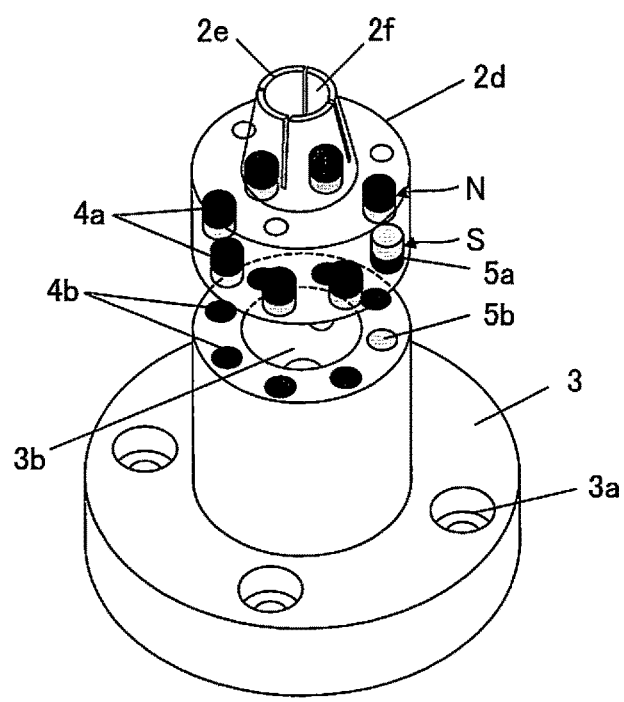
FIG. 2 is a view showing that a pair of magnets among a plurality of magnets disposed in the tool holder and the shaft have polarities opposite to those of the other magnets.

FIG. 2 is a view showing that a pair of magnets (one magnet 5a disposed in the tool holder 2 and one magnet 5b disposed in the shaft 3) among the plurality of magnets 4a, 5a; 4b, 5b respectively disposed in the tool holder 2 (tool holder body portion 2c1) and the shaft 3 have polarities opposite to those of the other magnets (magnets 4a and 4b). Specifically, the magnet 5a disposed in the tool holder 2 has a polarity different from those of the other magnets 4a disposed in the tool holder 2, and the magnet 5b disposed in the shaft 3 has a polarity different from those of the other magnets 4b disposed in the shaft 3.

Figure 3:
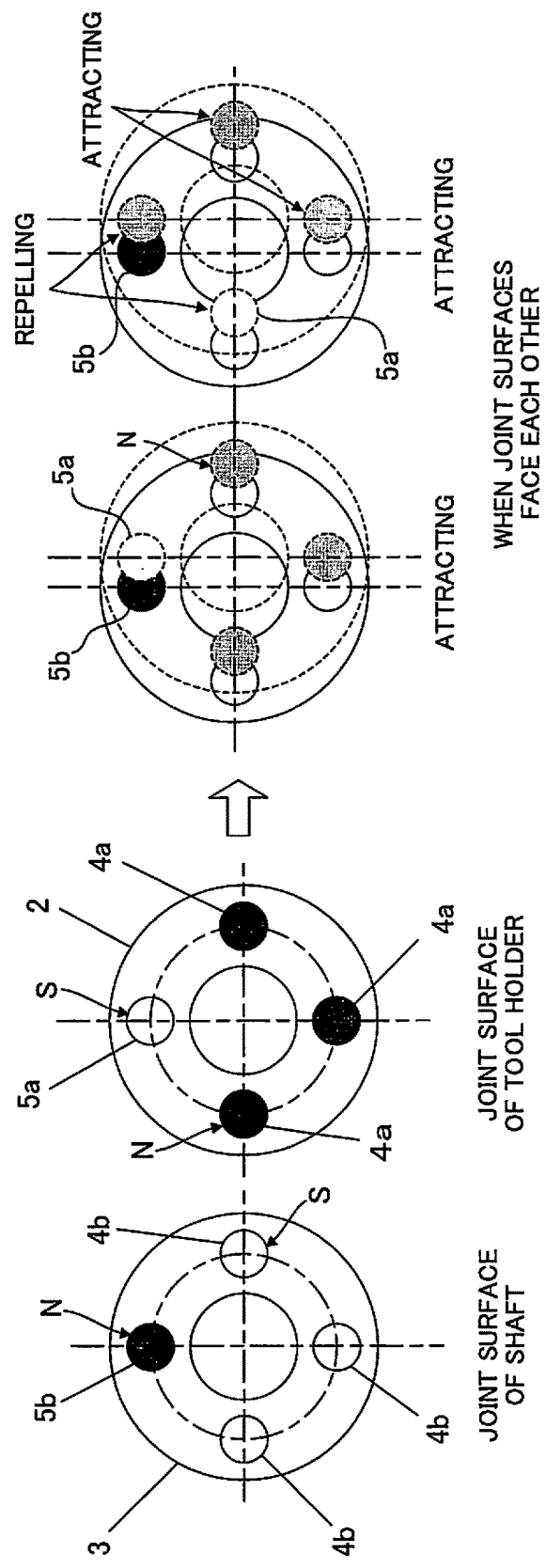
FIG. 3 is a diagram for explaining an example in which magnets having the same shapes are disposed in a tool holder body portion and the shaft to be equally spaced on concentric circles.

However, if the plurality of magnets 4a, 5a; 4b, 5b having the same shapes (same strengths) are disposed in both of the surface of the tool holder body portion 2d and the surface of the shaft 3 to be equally spaced on concentric circles as shown in FIG. 3, a rotational displacement of the tool holder 2 with respect to the shaft 3 by a certain angle makes the paired magnets 5a and 5b no longer able to attract each other, and causes each of the paired magnets 5a and 5b and any one of the other magnets 4b and 4a to repel each other. As a result, the tool holder 2 cannot be aligned with respect to the shaft 3.

Even if the magnets 4a, 5a; 4b, 5b are randomly spaced, rather than equally spaced, on concentric circles, and if attracting between the magnets is stronger than repelling therebetween, the tool holder 2 is connected to the shaft 3 at a position different from a position at which alignment is to be achieved.

Figure 4:
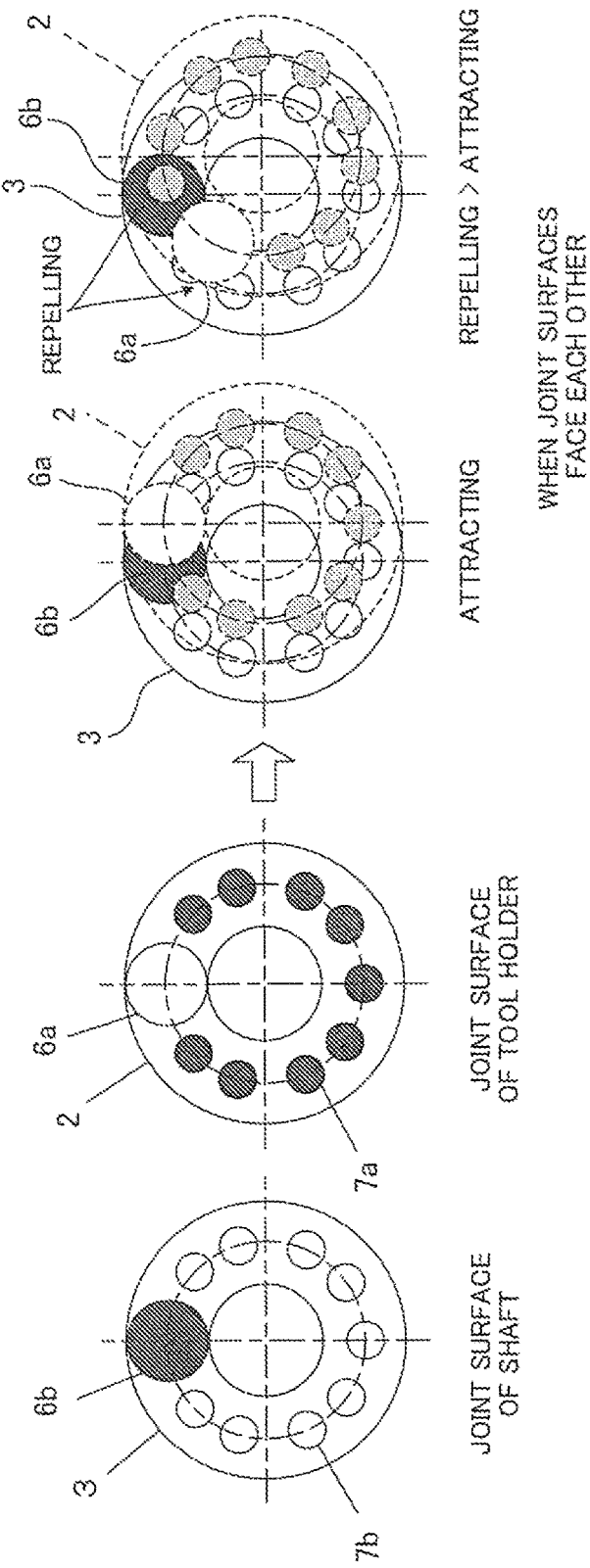
FIG. 4 is a diagram for explaining an example in which a pair of magnets for alignment having larger sizes than other magnets is respectively disposed in the tool holder and the shaft.

FIG. 4 is a diagram for explaining an embodiment in which a pair of magnets for alignment having larger sizes than other magnets is respectively disposed in the tool holder 2 and the shaft 3.

One magnet 6a disposed in the tool holder 2 has a stronger magnetic force (has a larger magnet shape or has a stronger magnetic force) than other magnets 7a disposed in the tool holder 2, and one magnet 6b disposed in the shaft 3 has a stronger magnetic force (has a larger magnet shape or has a stronger magnetic force) than other magnets 7b disposed in the shaft 3.

If the pair of magnets 6a and 6b disposed for alignment have larger sizes than the other magnets 7a and 7b as shown in FIG. 4, when the tool holder 2 is rotationally displaced with respect to the shaft 3 by a certain angle and is out of the phase in which alignment is achieved, the magnets 6a and 6b generate repelling force with respect to the other magnets 7a and 7b, and no longer attract each other. Also, as shown in FIG. 4, the magnets 6a, 7a; 6b, 7b are not axially symmetric. This is a factor causing an imbalance of a spindle shaft to which the shaft 3 is fixed, and weakens attractive forces.

Figure 5:
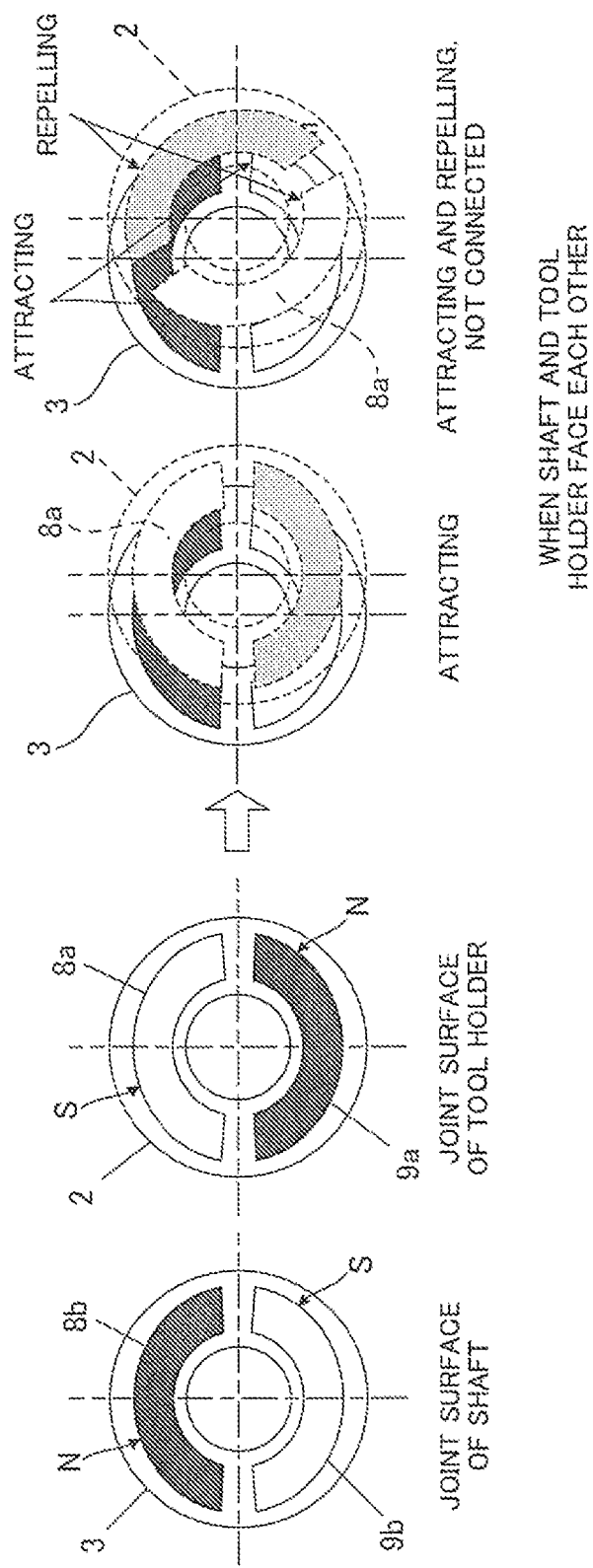
FIG. 5 is a diagram showing an example in which crescentic magnets are disposed in the shaft and the tool holder.

FIG. 5 shows an example in which crescentic magnets 8a, 9a; 8b, 9b are respectively disposed in the shaft 3 and the tool holder 2.

When the tool holder 2 rotates with respect to the shaft 3 by a certain angle from a position in which the magnets 8a and 9a of the tool holder 2 correspond to the magnets 8b and 9b of the shaft 3 (position of the phase in which alignment is achieved), attracting and repelling between the magnets 8a and 9a and the magnets 8b and 9b are mixed, and the tool holder 2 comes into a state in which the tool holder 2 cannot be connected to the shaft 3 by magnetic forces.

Figure 6:
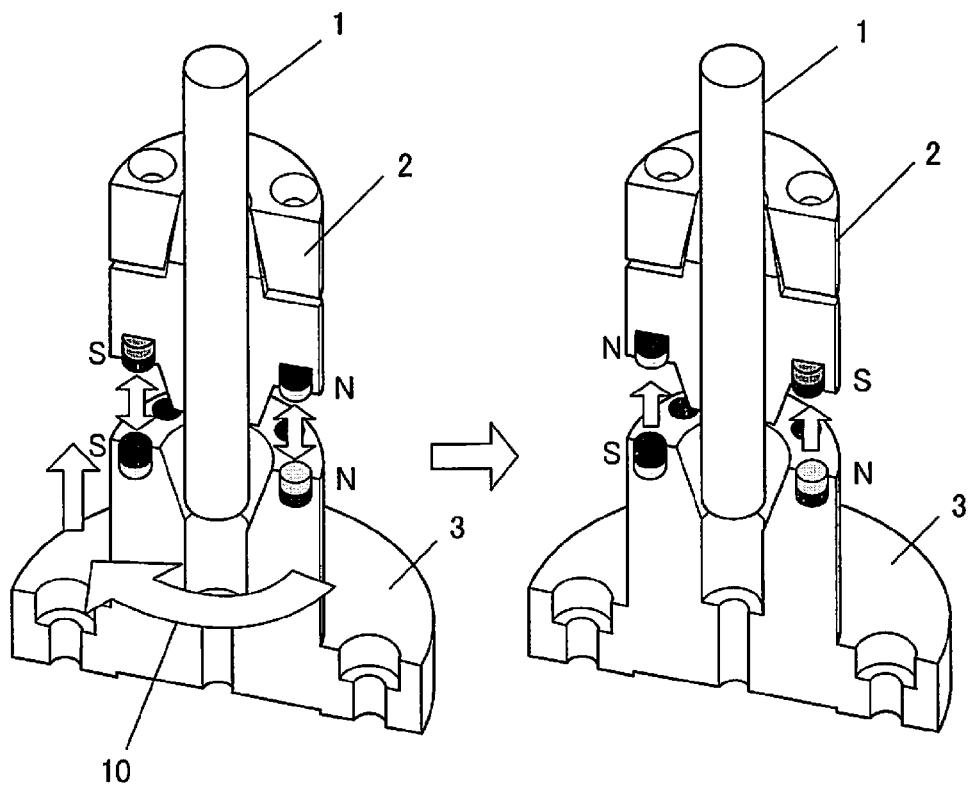
FIG. 6 is a diagram showing that the shaft is rotatably supported by a rotary shaft of a spindle device with a fluid bearing interposed therebetween.

FIG. 6 is a diagram showing that the shaft is rotatably supported by a rotary shaft of a spindle device with a fluid bearing interposed therebetween.

The tool holder 2 is aligned with respect to the shaft 3 such that the magnets 8a and 9a of the tool holder 2 and the magnets 8b and 9b of the shaft 3 repel each other, and the tool holder 2 is caused to approach the shaft 3 supported by a fluid bearing with the tool holder 2 kept in a non-rotatable state. The approach of the tool holder 2 is stopped immediately before the tool holder 2 is joined to the shaft 3. Then, the shaft 3 rotates (in a direction indicated by an arrow 10) with respect to the tool holder 2 (kept in a non-rotatable state) to a position in which strong attractive forces act between the magnets 8a and 9a of the tool holder 2 and the magnets 8b and 9b of the shaft 3, and the tool holder 2 is connected to (aligned with respect to) the shaft 3 in a state in which the rotation of the shaft 3 is stopped. Thus, the tool holder 2 is connected to the shaft 3 at an only position at which alignment is achieved.

Moreover, in the shaft 3 of FIG. 6, a plurality of magnets can be disposed in an axially symmetric manner. Accordingly, this structure is ideal in terms of the balance of a spindle and magnetic forces for aligning the tool holder 2 with respect to the shaft 3. Even when the magnets 8a, 9, 8b, 9b respectively disposed in the shaft 3 and the tool holder 2 shown in FIG. 6 are arranged in a manner such as shown in FIG. 4 or 5, the shaft 3 having the tool 1 attached thereto can be automatically exchanged by matching the phases of the tool holder 2 and the shaft 3 with each other.

With the structure shown in this FIG. 6, the tool 1 for machining is attached to the tool holder 2 with the phase fixed. A plurality of tool holders 2 are prepared for rough machining, finish machining, and the like. For each of the tool holders 2, the phases of the tool holder 2 and the shaft 3 of the spindle are matched with each other, and the dynamic balance adjustment of the spindle is performed in advance. The tool holder 2 and the shaft 3 are connected to each other by the above-described actions of magnets. Since dynamic balance has also already been adjusted, machining can be started soon after the tool holder 2 is exchanged.

When the tool holder 2 and the shaft 3 of FIG. 6 come close to each other, the shaft 3 rotates to a position at which attractive forces of the magnets respectively provided in the tool holder 2 and the shaft 3 are generated, because the shaft 3 is rotatably supported by the rotary shaft of the spindle device with the fluid bearing interposed therebetween.

At a position where attracting and repelling of the magnets match each other during relative rotation between the tool holder 2 and the shaft 3 as shown in FIG. 5, the rotation of the shaft 3 temporarily stops immediately before the tool holder 2 and the shaft 3 are connected to each other. Accordingly, by connecting the tool holder 2 to the shaft 3 after it is confirmed that the shaft 3 rotates to this predetermined alignment position, the tool holder 2 can be aligned with respect to the shaft 3.

Figure 7:
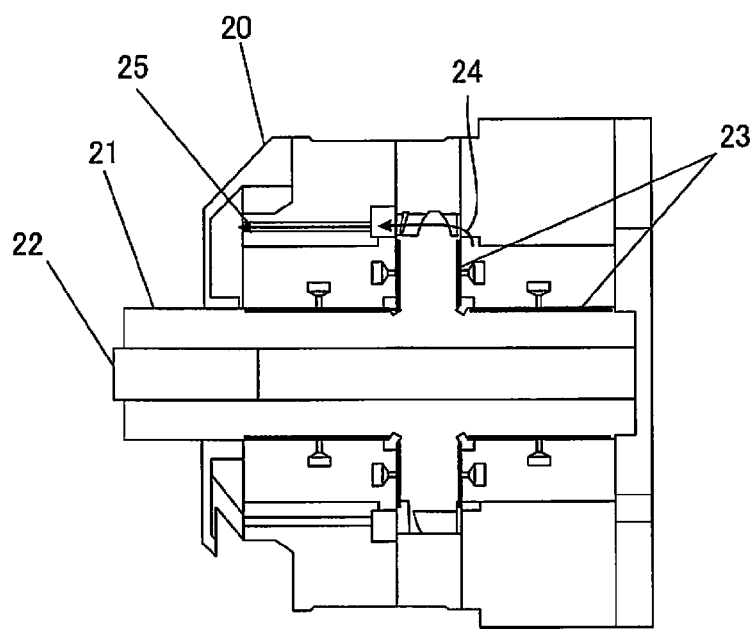
FIG. 7 is a diagram showing the internal structure of an air turbine spindle (spindle device) including an air bearing.

FIG. 7 is a diagram showing the internal structure of an air turbine spindle (spindle device) including an air bearing.

A rotary shaft 21 of an air turbine spindle 20 is rotatably supported by an air bearing 23. The shaft 3 is fixed to an end face 22 of the rotary shaft 21 with bolts (not shown). Air discharged from the air bearing 23 is released from a turbine exhaust hole 25 to the outside of the air turbine spindle 20 as indicated by an arrow 24 in FIG. 7.

Figure 8:
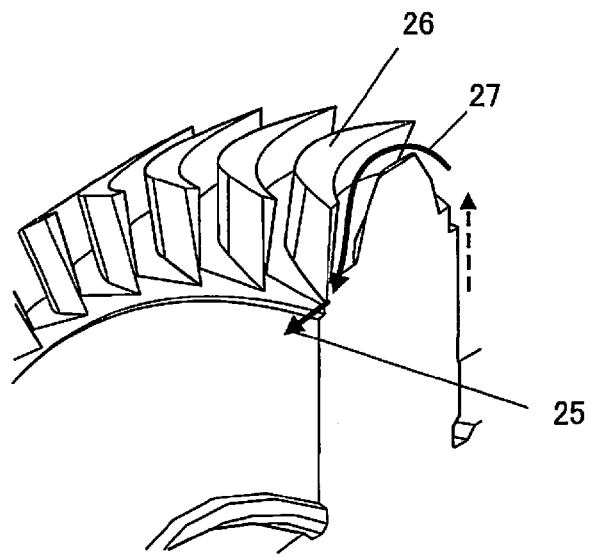
FIG. 8 is a diagram showing a structure of an air turbine spindle of FIG. 7 in which air from the air bearing passes through a turbine blade and flows through the turbine exhaust hole.

The air turbine spindle 20 including the air bearing 23 has a structure in which air from the air bearing 23 passes through a turbine blade 26 and flows through the turbine exhaust hole 25 as indicated by arrows 27 in FIG. 8. Air flows through the turbine even when the driving turbine is stopped. Thus, the shaft 3 naturally rotates even when the turbine is stopped. This state, in which the shaft 3 is naturally rotating, is a state in which phase matching by magnetic forces can be easily performed.

Figure 9A:
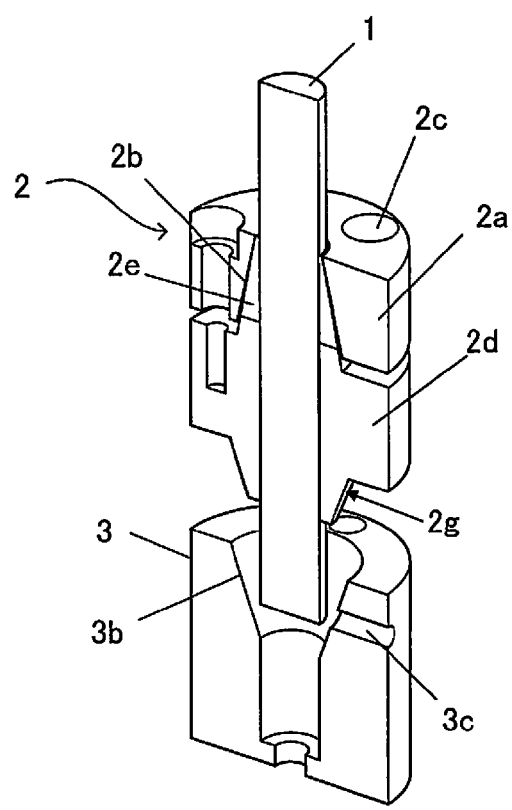
FIGS. 9A and 9B show a structure in which a tapered portion is provided in a joint between the tool holder and the shaft.
Figure 9B:
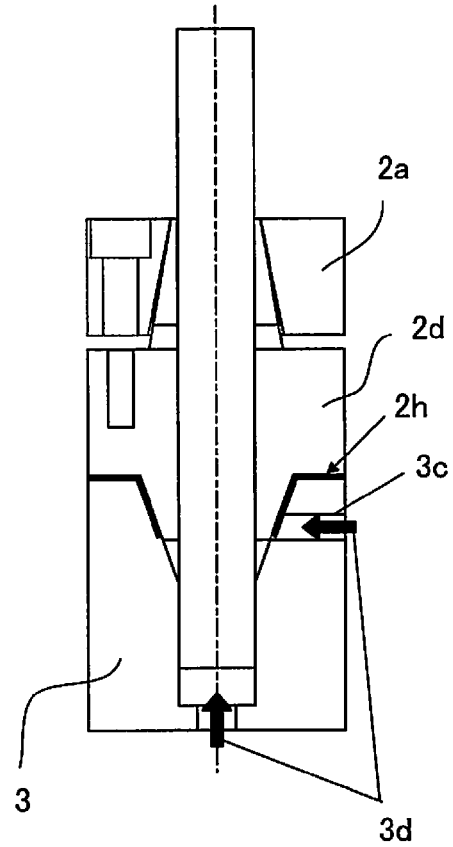

FIGS. 9A and 9B show a structure in which a tapered portion is provided in a joint between the tool holder 2 and the shaft 3.

Providing a tapered portion 2g in the tool holder body portion 2d of the tool holder 2 enables the tool holder 2 to be coaxially connected to the shaft 3. Moreover, an air vent 3c is provided in the shaft 3. When the tool holder 2 is separated off from the shaft 3, air is supplied through the air vent 3c into the shaft 3 in directions indicated by arrows 3d. The tool holder 2 which is attracted by magnetic forces and which has the tapered portion 2g of the tool holder body portion 2d fitted into the funnel-shaped portion 3b of the shaft 3 cannot be easily separated off from the shaft 3. Accordingly, a force is applied to the tool holder 2 from the outside (by axially applying the pressure of a fluid from the inside of the shaft 3, applying a pressure to a hole provided in a joint 2h between the tool holder body portion 2d and the shaft 3 using a fluid, pushing the tool holder 2 with a rod, or the like) to make it easy to separate the shaft 3 (funnel-shaped portion 3b) from the tool holder 3 (tapered portion 2g of the tool holder body portion 2d).

The invention claimed is:

1. A tool gripping mechanism, comprising:
   a tool holder to which a tool can be attached; and
   a shaft to which the tool holder is attached, the shaft being fixed to a rotary shaft of a spindle device,
   wherein the tool holder and the shaft include a first surface and a second surface, respectively, the first and second surfaces facing each other,
   at least two magnets are disposed in the first surface of the tool holder, and at least one of the at least two magnets has pole directions different from those of the other of the at least two magnets,
   magnets are disposed in the second surface of the shaft to be located at positions corresponding to the magnets disposed in the first surface and to generate magnetic forces in directions in which the magnets disposed in the first surface are attracted,
   less than half of the magnets disposed in the second surface of the shaft have a first magnetic pole facing the first surface of the tool holder, and
   more than half of the magnets disposed in the second surface of the shaft have a second magnetic pole facing the first surface of the tool holder, the second magnetic pole opposite to the first magnetic pole.

2. The tool gripping mechanism according to claim 1, wherein the shaft is supported by the rotary shaft of the spindle device with a fluid bearing interposed therebetween.

3. The tool gripping mechanism according to claim 1, wherein the tool holder and the shaft include paired tapered portions, respectively, such that the tool holder is coaxially attached to the shaft.

4. The tool gripping mechanism according to claim 1, wherein the shaft includes a through hole at an end face opposite to a surface to which the tool holder is attached, the through hole axially passing through the end face toward the tool holder.

5. The tool gripping mechanism according to claim 1, wherein the magnets disposed in the second surface of the shaft are axially symmetric with respect to the shaft.

6. The tool gripping mechanism according to claim 1, wherein
   the magnets disposed in the second surface of the shaft are physically arranged symmetrically around an axis of the shaft.

7. The tool gripping mechanism according to claim 1, wherein
   a magnet among the magnets disposed in the second surface of the shaft has a larger size than other magnets among the magnets disposed in the second surface of the shaft.

8. The tool gripping mechanism according to claim 7, wherein
   the magnets disposed in the second surface of the shaft are physically arranged symmetrically around an axis of the shaft.

9. The tool gripping mechanism according to claim 1, wherein
   a magnet among the magnets disposed in the second surface of the shaft has a stronger magnetic force than other magnets among the magnets disposed in the second surface of the shaft.

10. The tool gripping mechanism according to claim 9, wherein
    the magnets disposed in the second surface of the shaft are physically arranged symmetrically around an axis of the shaft.

11. The tool gripping mechanism according to claim 1, wherein
    the shaft is supported by the rotary shaft of the spindle device with an air bearing interposed therebetween, and
    the spindle device is an air turbine spindle.

12. The tool gripping mechanism according to claim 1, wherein
    the tool holder and the shaft include paired first and second tapered portions, respectively,
    when the tool holder is coaxially attached to the shaft, one of the first and second tapered portions is received inside the other of the first and second tapered portions,
    the shaft includes an air vent extending in a radial direction of the shaft, and
    the air vent has an opening on an inclined surface of the second tapered portion, and configured to direct an air flow at a corresponding inclined surface of the first tapered portion when the tool holder is to be detached from the shaft.

* * * * *